7921X
E. M. Chafee,
Mail Bag.
Patented Dec. 31, 1833.
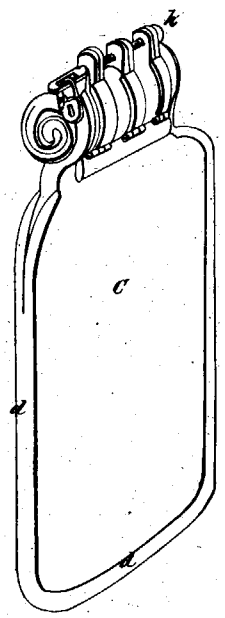
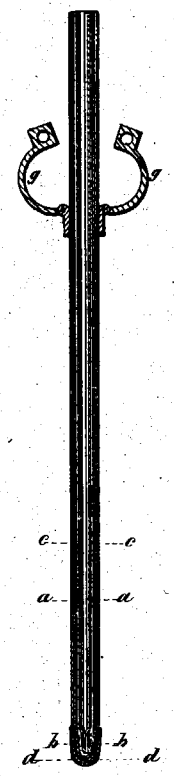
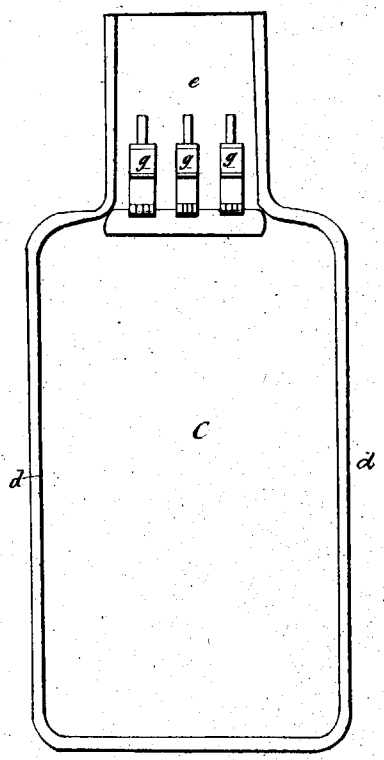
N. PETERS, PHOTO-LITHOGRAPHER, WASHINGTON, D. C.

12/31/1833 7921x

Edwin M. Chaffee of Roxbury Massachusetts

Letters Patent

The Schedule referred to in these Letters Patent and making part of the same containing a description in the words of the said Edwin M Chaffee him-self of his improvement in the mode of constructing India Rubber Water Proof Mail and and travelling Bags.

To all whom it may concern. Be it known that I Edwin M Chaffee of Roxbury in the County of Norfolk and Commonwealth of Massachusetts have invented a new and useful improvement, being a mode of constructing India Rubber Waterproof Mail and travelling Bags. and that the following is a full and exact description of the [illegible] said invention I take cloth of any suitable kind that is covered with India Rubber from which I cut the pattern for the lining of the mail or travelling Bag in two parts, precisely alike in size and shape, and of such dimensions as is required, but I prefer to have one end not narrower than the main body so as to form a neck of sufficient width to admit letters, parcels &c. I then place the two parts so cut one upon the other, the cloth surface forming the the inside of the bag, the coating of India Rubber being on the outside. The two pieces are then bound together by cementing a strip of cloth coated on both sides with india Rubber, along the edges and lapping over on each side about half an inch or more. I then cut two more pieces of [illegible] in cloth coated on both sides with india Rubber, of the same shape as the lining but about half an inch larger all round. These two last named pieces form the outside of the bag and are firmly cemented to the lining be-fore described, and the outside pieces being larger will consequently be cemented together outside of the lining forming an edge outside of the lining all round the bag. The neck of the bag I make from six to twelve inch-es in length and from eight to twelve inches in width according to the size of the bag. The neck must be lined with India Rubber before it is put together which serves to render it water tight when it is closed. The bag is closed by rolling up the neck firmly and closely, and is kept closed by one or [illegible] straps, [illegible] upon each side of the

7921X neck of the bag. the straps are riveted to a piece of India Rubber cloth
which is cemented across [illegible] at such a distance from
the mouth as is required for the rolling. The straps are formed and pla
ced in such a manner as that those on one side will shut between
those on the other side. and having eyes or holes in them which will admit
a rod of brass or iron to pass through them and unite them together and
thus fasten and secure the mouth of the bag. The rod should have a
head at one end and at the other a hole or staple for the reception of
a Padlock too large to be drawn thro the holes in the clasps. The mouth
may be closed by elliptical springs. the convex parts shutting together with
the edges of the mouth of the bag between them and by various other ways
and contrivances. not varying my invention &c. My claim is to the [illegible] the mode
of constructing and manufacturing Water proof Bags from India Rubber
cloth as above described. In testimony that the foregoing is a true spe
cification of my said improvement I have hereunto set my hand this
twenty first day of December in the year of our Lord One thousand
Eight hundred and thirty three.

Copd
WH
Witnesses
Samuel Blake
Thomas A Dexter

Edwin M. Chaffee.

(656 words)